(12) United States Patent
Okamoto

(10) Patent No.: US 7,889,373 B2
(45) Date of Patent: Feb. 15, 2011

(54) IMAGE PROCESSING APPARATUS

(75) Inventor: Tomoyuki Okamoto, Suita (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1119 days.

(21) Appl. No.: 11/584,505

(22) Filed: Oct. 23, 2006

(65) Prior Publication Data

US 2007/0097415 A1    May 3, 2007

(30) Foreign Application Priority Data

Oct. 27, 2005    (JP)    ............................. 2005-313589

(51) Int. Cl.
  *G06F 15/00*    (2006.01)
  *G06F 15/173*    (2006.01)
(52) U.S. Cl. ..................... 358/1.15; 709/223
(58) Field of Classification Search ................ 358/1.15, 358/1.13, 1.14, 1.16, 1.18, 296, 2.1, 1.12, 358/1.2; 709/229, 204, 223, 249, 220, 227, 709/245, 219, 238; 710/8, 19; 726/1, 2, 726/4, 26, 27
See application file for complete search history.

(56) References Cited

U.S. PATENT DOCUMENTS

| 6,192,127 | B1 | 2/2001 | Nagashima et al. | |
| 6,411,393 | B1 | 6/2002 | Wakasugi | |
| 6,745,334 | B1 | 6/2004 | Ikegami | |
| 6,918,042 | B1 | 7/2005 | Debry | |
| 6,934,042 | B1 | 8/2005 | Morita et al. | |
| 2003/0167336 | A1* | 9/2003 | Iwamoto et al. | ............. 709/229 |
| 2009/0031006 | A1* | 1/2009 | Johnson | ...................... 709/218 |

FOREIGN PATENT DOCUMENTS

| JP | 2002-109172 A | 4/2002 |
| JP | 2004-157845 A | 6/2004 |
| JP | 2004-252768 A | 9/2004 |
| JP | 2005-107711 A | 4/2005 |

* cited by examiner

*Primary Examiner*—Saeid Ebrahimi Dehkordy
(74) *Attorney, Agent, or Firm*—Buchanan Ingersoll & Rooney PC

(57) ABSTRACT

Disclosed are an image processing apparatus, a management apparatus for an image processing apparatus, a method for managing an image processing apparatus, a program and a storage medium with which it is possible to perform an appropriate management when a user requests another user to perform a process using the image processing apparatus on his behalf. A substitution account that is used when a process is performed on behalf of a first user (requestor user) is registered in a substitution account database. A process performed with the substitution account is managed as a process performed with an account of the first user.

24 Claims, 17 Drawing Sheets

Fig. 4

| USER ID | AUTHENTICATION INFORMATION | | TRANSMISSION INFORMATION | AMOUNT INFORMATION | | ACCESS CONTROL INFORMATION | | | |
|---|---|---|---|---|---|---|---|---|---|
| | NAME | PASSWORD | MAIL ADDRESS | NO. OF PROCESSED PAGES | MAX. NO. OF PAGES | SCAN | COPY | PRINT | FAX |
| Okamoto | OKAMOTO | 4hr&dsg | oka@ab.ne.jp | 523 | 1000 | × | ○ | ○ | × |
| Matsuda | MATSUDA | bhsk95f1 | mat@ab.ne.jp | 26 | 2000 | ○ | ○ | ○ | × |
| Toyama | TOYAMA | mkut4fsp | ty@ab.ne.jp | 275 | 10000 | ○ | ○ | ○ | ○ |
| ... | ... | ... | ... | ... | ... | ... | ... | ... | ... |

Fig. 5

| SUBSTITUTION ACCOUNT ID | REQUESTOR/REQUESTEE INFORMATION | | | EXPIRATION INFORMATION | | AUTHORIZATION / PAGE COUNT INFORMATION | | | | |
|---|---|---|---|---|---|---|---|---|---|---|
| | REQUESTOR ID | REQUESTEE ID | PASSWORD | EXPIRATION DATE | NO. OF LOGINS | SCAN | COPY | PRINT | FAX | COMBI NATION |
| ToyU991 | Toyama | Okamoto | | 2005/10/01 | 5 | × | 100 | 100 | × | ○ |
| MatU992 | Matsuda | | vbds86ga | 2005/10/02 | 0 | × | 50 | 50 | × | × |
| MatU993 | Matsuda | Okamoto | | | 2 | 30 | × | × | × | × |
| ... | ... | ... | ... | ... | ... | ... | ... | ... | ... | ... |

Fig. 6

```
SUBSTITUTION ACCOUNT REGISTRATION
                                    321    REQUESTOR ID: Matsuda
                                                                    311
    EXP. DATE :        5   DAYS (1~5)
    NO. OF LOGINS :    0   TIMES (1~5, 0 : UNLIMITED)
         331           322  332       341                         342
    ☑ FUNCTION LIMIT                 ☑ SPECIFY OPERATIONS
                                      ┌1 ▼ PRINT
     ☐ SCAN  ☐ PAGES                   NAME  CONF.pdf   REF
     ☑ COPY   50 PAGES(1~1974)
                                      ┌2 ▼ COPY
     ☑ PRINT   0 PAGES(1~1924)         COPY        5  COPIES
     ☐ FAX
                                      ┌3 ▼ NO SPEC
     ☑ USE OF INTERDEVICE
       COMBINATION FUNCTION
       IS NOT PERMITTED
         301
                                                                  303
    ☐ SPECIFY REQUESTEE
                        302
    USER ID :                PASSWORD :  vbds86ga

REGISTER    CANCEL
                                      351       352
```

Fig. 7

| SUBSTITUTION ACCOUNT ID | REQUESTOR ID | DATE OF REGISTRATION | ORDER | OPERATION INFORMATION | FILE NAME | NO. OF COPIES | END FLAG |
|---|---|---|---|---|---|---|---|
| MatU992 | Matsuda | 2005/09/27 | 1 | PRINT | CONF.pdf | | |
| MatU992 | Matsuda | 2005/09/27 | 2 | COPY | | 5 | |
| ... | ... | ... | ... | ... | ... | ... | ... |

Fig. 8

```
         NEW SUBSTITUTION ACCOUNT WILL BE REGISTERED

SUBSTITUTION ACCOUNT ID :   MatU992

PASSWORD                :   vbds86ga

REQUESTOR ID            :   Matsuda

REQUESTEE ID            :

EXPIRATION DATE         :   2005/10/02

NO. OF LOGINS           :

FUNCTION LIMIT          :   YES (COPY,PRINT)

INTERDEVICE COMBINATION FUNCTION   :   UNAVAILABLLE

OPERATION SPECIFICATION :   YES
```

| SEND MAIL | CONFIRM | RETURN |
| 401 | 402 | 403 |

IMAGE PROCESSING APPARATUS

This application is based on the Japanese Patent Application No. 2005-313589 filed on Oct. 27, 2005, the content of which is hereby incorporated by reference.

BACKGROUND OF THE INVENTION

1. Field of the Invention

The present invention relates to an image processing apparatus, a management apparatus for an image processing apparatus, a method for managing an image processing apparatus, an image processing instruction program and a storage medium.

2. Description of Related Art

For example, JP2004-252768A discloses a function for performing user authentication by input of the ID or password of a user using an image processing apparatus such as a printer or a copier, while managing the number of executed jobs, such as printing or copying, for each user separately and performing a charge accounting process in accordance with the number of executed jobs.

Performing a management process such as charge accounting for each user separately as described above may not be appropriate in some cases. For example, when a user requests another user to perform an operation such as copying on his behalf, the other user will be charged if he performs the operation after logging in with his own ID.

In order to charge the requesting side user, it is conceivable to use a method in which the requested side user is informed of the password of the requester user, but this can cause security problems and is therefore not preferable. To address such a case, JP2005-107711A discloses an example of the technique using IC cards.

However, this is not necessarily the best solution, since an additional cost will be needed to provide portable media such as IC cards, and there is the possibility that the media may be misused.

SUMMARY OF THE INVENTION

The present invention was made in view of the foregoing problems, and it is an object of the invention to provide an image processing apparatus, a management apparatus for an image processing apparatus, a method for managing an image processing apparatus, a program and a storage medium with which it is possible to appropriately manage a process performed in an image processing apparatus when a first user requests another user to perform the process on his behalf.

In order to address the above-described problems, an image processing apparatus according to one aspect of the present invention includes: a user identification information acquiring unit that acquires user identification information; a substitution account configuration manager that manages a configuration of a substitution account that is used when a process is performed on behalf of a first user; and an image processing amount managing unit that manages an amount of image processing performed with each account, and manages a process performed with the substitution account as a process performed with the account of the first user.

With the above configuration, when the user performing a process on behalf of the first user performs the process using a substitution account, the performed process is managed as a process performed using the account of the first user, so that it is possible to appropriately manage processing without using media such as IC cards.

A management apparatus for an image processing apparatus according to another aspect of the present invention is a management apparatus for an image processing apparatus that receives information transmitted from the image processing apparatus connected to the management apparatus, and manages a process performed in the image processing apparatus, including: a substitution account configuration manager that manages a configuration of a substitution account that is used when a process is performed on behalf of a first user; and an image processing amount managing unit that manages an amount of image processing performed with each account, and manages a process performed with the substitution account as a process performed with the account of the first user.

This management apparatus manages processes performed in at least one image processing apparatus that is connected to a network such as a LAN with receiving information transmitted from the at least one image processing apparatus. While the management apparatus can be implemented by installing a program on an information processing apparatus such as a personal computer or a work station, it is possible to provide the image processing apparatus with the function of the management apparatus. Using the management apparatus makes it possible to manage together the processes performed in each of a plurality of image processing apparatuses using the same account, and thus is convenient for managing processes in an environment in which multiple image processing apparatuses are connected and the same user uses each of the image processing apparatuses.

A program according to still another aspect of the present invention is an image processing instruction program that is to be installed on a computer and that instructs an image processing apparatus to perform a process, the program letting the computer perform a process of: transmitting identification information of a substitution account, in addition to data for performing the process, to the image processing apparatus. For example, this program is installed on a personal computer or the like that instructs the image processing apparatus to perform a print process. With this program, a merit using the substitution account also can be achieved in the case where a process is performed in accordance with an instruction from an external apparatus. It is possible to adopt a configuration in which authentication information such as a password is transmitted in addition to the identification information of the substitution account, and the image processing apparatus obtains an authentication result as to whether the print process may be performed.

A program according to further aspect of the present invention is a program to be installed on an image processing apparatus that performs an image processing amount managing process of managing an amount of image processing performed with each account, the program letting the image processing apparatus perform: a substitution account registration process of registering a substitution account that is used when a process is performed on behalf of a first user; and a substitution account managing process of managing a process performed with the substitution account as a process performed with the account of the first user. For example, this program can be additionally installed on an image processing apparatus that performs a conventionally used account management. In that case, it is possible to readily realize management using the substitution account by the existing image processing apparatus.

A program according to further aspect of the present invention is a program to be installed on a management apparatus that performs an image processing amount managing process of managing an amount of image processing performed with each account in at least one image processing apparatus, the program letting the management apparatus perform: a substitution account registration process of registering a substitution account that is used when a process is performed on behalf of a first user; and a substitution account managing process of managing a process performed with the substitution account as a process performed with the account of the first user.

It should be noted that the above-described program includes not only a program that can be directly executed with a processor such as a CPU, but also a program in a source program format, a program that has been subjected to compression processing and an encrypted program, for example. In addition, the above described programs may be distributed on the market as various types of storage media in which the programs are stored, and also may be supplied to the market via various networks such as the Internet.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 4 is a diagram illustrating an example of the content of an account database 221.

FIG. 5 is a diagram illustrating an example of the content of a substitution account database 222.

FIG. 6 is a diagram showing an example of the screen that is displayed on a display unit 12 for registering a new substitution account.

FIG. 7 is a diagram showing an example of the content of a requested operation management table.

FIG. 8 is a diagram showing an example of a registered content confirmation screen that is displayed on the display unit 12.

DETAILED DESCRIPTION OF THE PREFERRED EMBODIMENT

Hereinafter, embodiments of the present invention will be described with reference to the accompanying drawings.

Embodiment 1

Figure 1:
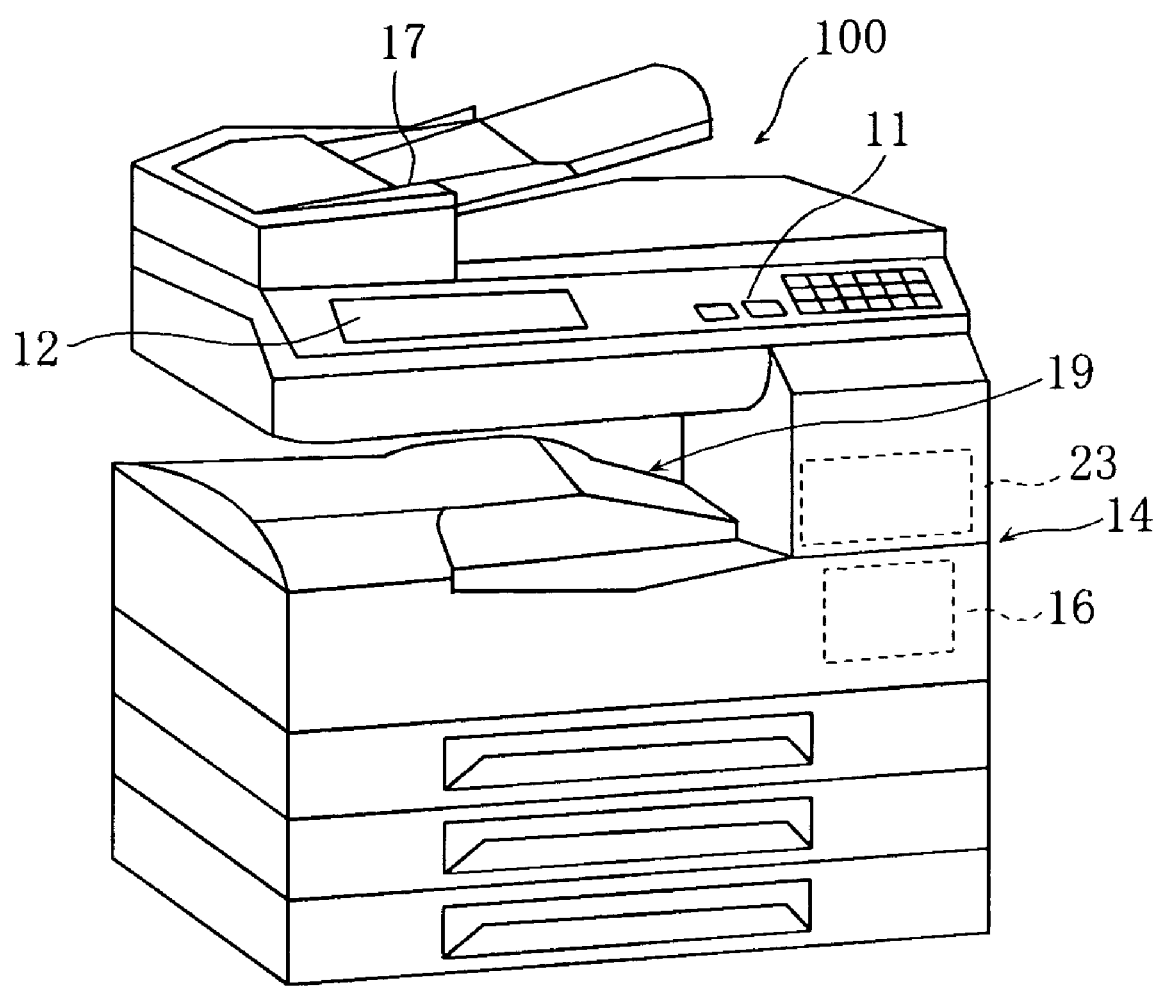
FIG. 1 is a diagram showing an example of the appearance of an MFP.

FIG. 1 is a diagram showing an example of the appearance of an MFP (Multifunction Peripheral) 100, which is an example of the image processing apparatus. The MFP 100 is a printing device in which, for example, a copier, network printer and scanner functions, as well as a facsimile or document server function are integrated. The MFP 100 is also called "a multifunction device", for example.

Figure 2:
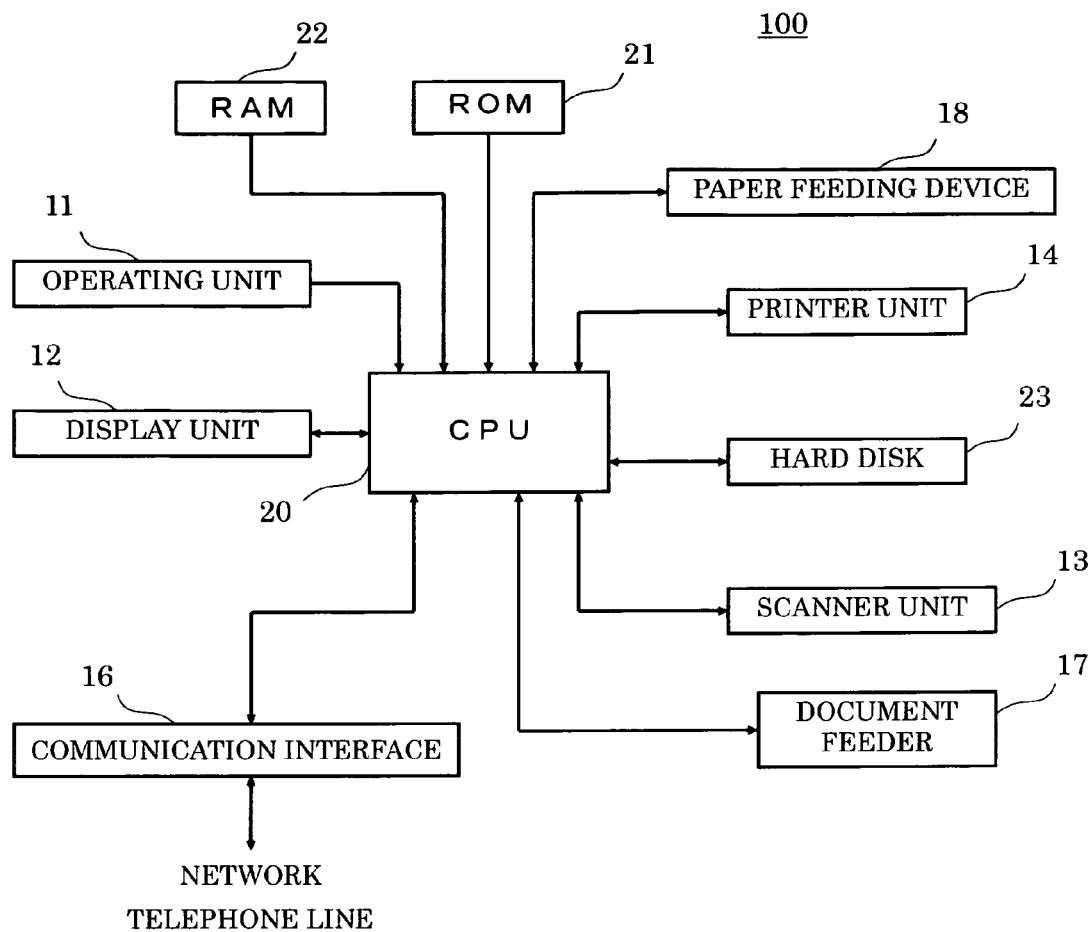
FIG. 2 is a block diagram showing an example of the hardware configuration of the MFP.

FIG. 2 is a diagram showing an example of the hardware configuration of the MFP 100. The MFP 100 includes, for example, an operating unit 11, a display unit 12, a scanner unit 13, a printer unit 14, a communication interface 16, a document feeder 17, a paper feeding device 18, a tray 19 (see FIG. 1), a CPU 20, a ROM 21, a RAM 22, and a hard disk 23.

The operating unit 11 includes, for example, a plurality of keys for inputting numbers, characters, symbols and the like, a sensor that recognizes any key pressed, and a transmitting circuit that transmits a signal indicating any key recognized to the CPU 20.

The display unit 12 displays, for example, a screen that displays messages to a user, a screen on which a user inputs the details of settings and processes, and a screen that displays results of processes performed with the MFP 100. In this embodiment, a touch panel is attached to the display unit 12, and is included in the operating unit 11. That is, the touch panel is provided with a function for detecting positions on the touch panel that are touched by user's fingers, and transmitting signals indicating the results of the detection to the CPU 20.

The scanner unit 13 projects light on an original and scans images, and generates digital image data, e.g. density data representing the density of RGB or black. The thus obtained image data is used in the printer unit 14 for printing, and also stored in the hard disk 23 after being converted into a file in a TIFF, PDF, or JPEG format, for example. The image data may be converted into facsimile data, and outputted for facsimile transmission. The document feeder 17 is provided above the body of the MFP 100, and used for successively transporting a single or a plurality of sheets of originals to the scanner unit 13.

The printer unit 14 prints an image that has been scanned with the scanner unit 13, an image based on data that has been transmitted from an external apparatus, such as a PC (personal computer), connected to the MFP 100 via a network such as a LAN, or an image of facsimile data received by fax, on a recording sheet such as a paper or a film. The paper feeding device 18 is provided below the body of the MFP 100, and used for feeding a recording sheet to the printer unit 14. The recording sheet on which the image is printed with the printer unit 14 is ejected onto the tray 19.

The communication interface 16 is a device for communicating with an external apparatus such as a PC via a network, or performing, for example, facsimile transmission and reception via a telephone circuit. As the communication interface 16, it is possible to use, for example, an NIC (network interface card), a modem or a TA (terminal adaptor).

The ROM 21 stores a program and data for implementing the basic functions of the MFP 100, including, for example, scanning of images, copying of originals, transmission and reception of facsimile data, network printing, and a document server function (box function). In addition, the ROM 21 stores a program and data for implementing the functions according to this embodiment. A part or the whole of this program or data may be installed on the hard disk 23. In this case, the program or data installed on the hard disk 23 is loaded into the RAM 22, as necessary. The functions described in this embodiment can be implemented not only with the CPU 20, but also with dedicated hardware. It is also possible to implement a part of the functions using a general purpose program such as an operating system (OS). Further, a nonvolatile semiconductor memory may be used as the ROM 21 or the RAM 22.

Figure 3:
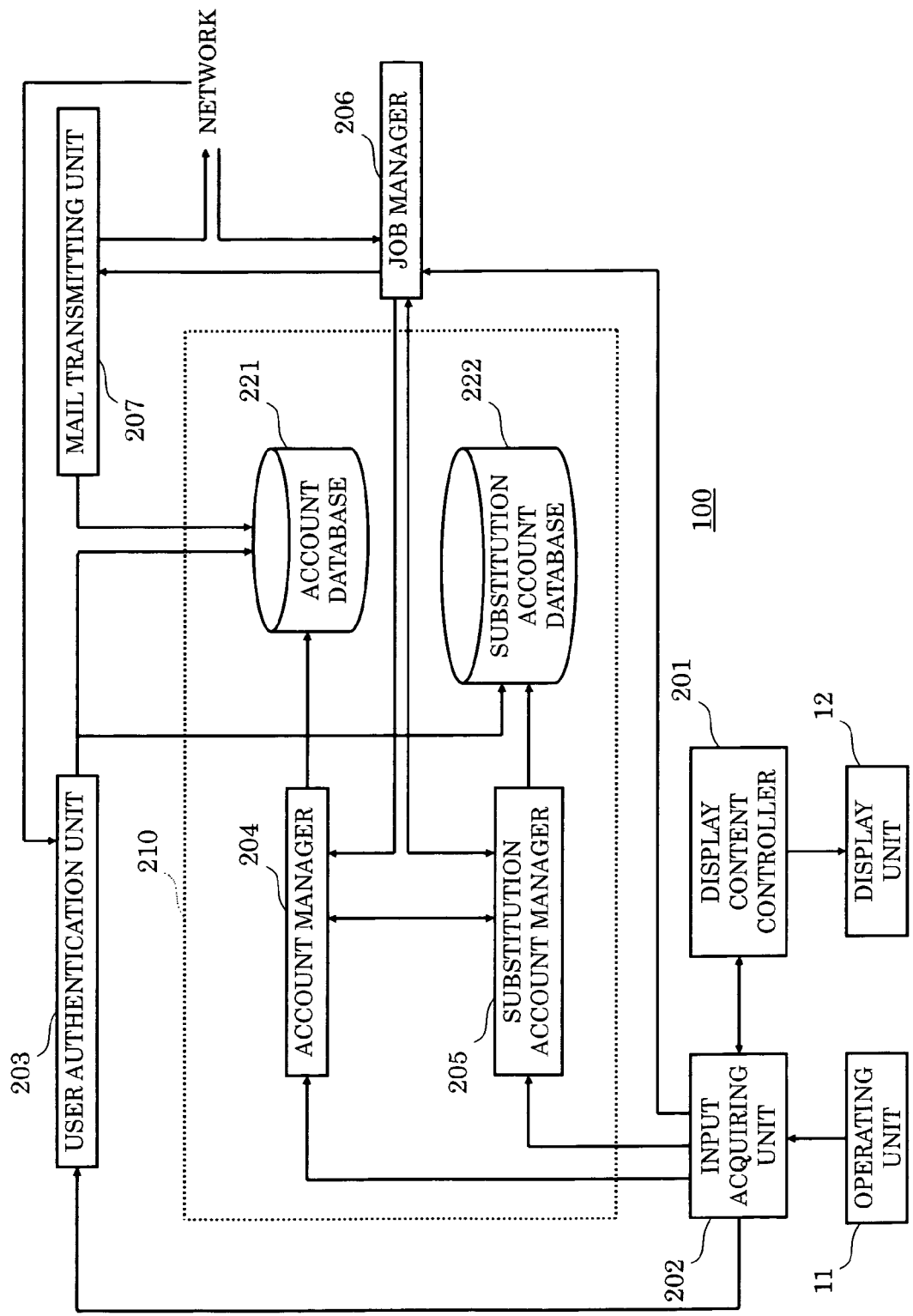
FIG. 3 is a block diagram illustrating an example of the functional configuration of the MFP.

FIG. 3 is a block diagram illustrating an example of the functional configuration of the MFP 100 according to this embodiment. The MFP 100 includes a display content controller 201, an input acquiring unit 202, a user authentication unit 203, an account manager 204, a substitution account manager 205, a job manager 206, a mail transmitting unit 207, an account database 221 and a substitution account database 222. The account database 221 and the substitution account database 222 may be provided in the hard disk 23, for example. The account manager 204, the substitution account manager 205, the account database 221 and the substitution account database 222 constitute the image processing amount managing unit 210.

The display content controller 201 controls contents that are displayed on the display unit 12. The input acquiring unit 202 acquires input from the operating unit 11 (including the touch panel). The user authentication unit 203 acquires authentication information such as a user ID (user identification information) and a password that is input via the operating unit 11, or transmitted from an external apparatus such as a personal computer (PC) via a network, and performs user authentication by referring to the content of the account database 221.

FIG. 4 is a diagram showing an example of the content of the account database 221. The account database 221 according to this embodiment includes authentication information, transmission information, amount information and access control information, using a user ID as a key. It stores a name and a password as the authentication information. At the time of a login at which a normal account, i.e. a user ID assigned to each user is input, the user authentication unit 203 decides whether to permit the user to log in, by verifying the input user ID and password against the user ID and the password that are stored in the account database 221. Additionally, it is possible to hold the data for user authentication in a table that is different from the account management table, or it is also possible to use an external authentication server. Further, it is possible to adopt a configuration in which authentication is performed using only the user ID.

The account manager 204 performs, for example, addition, update and deletion of the content of the account database 221. Here, the content of the account database 221 will be described in further detail. The transmission information is information for providing a notification to a user, and electronic mail addresses are stored as the transmission information in this embodiment. As the amount information, the maximum number of pages that is set for each user in advance, and the number of pages that have been actually processed are stored. The maximum number indicates the number of pages that each user can actually process. After the number of actually processed pages has reached the maximum number, no more pages can be processed. The number of actually processed pages can be used for a charge accounting process for each user. In this case, actually processed pages with a substitution account can be charged for a requestor user.

The access control information is used for configuring the details of available functions for each user. The example shown in FIG. 4, for example, is configured such that Mr. Okamoto can use a copy function and a print function, but cannot use a scan function or a facsimile function. It is possible to store and manage the maximum number of pages and the number of processed pages for each function. The number of processed pages can be counted in accordance with a notification from the job manager 206.

The substitution account manager 205 performs addition, update and deletion of the content of the substitution account database 222. "Substitution account" refers to an account that is registered when a requestor user requests another user to perform an operation on his behalf FIG. 5 is a diagram illustrating an example of the content of the substitution account database 222.

The substitution account database 222 includes requestor/requestee information, expiration information, and authorization/page count information, using a substitution account identifier, which is identification information assigned to the registered substitution account, as a key. The requestor/requestee information is information relating to a requestor user and a requestee user.

In this embodiment, the user ID of a requestor user, which requests another user to perform an operation on his behalf, is stored as a requester ID. It is possible to specify the other user, which is requested to perform an operation on behalf of the requestor user. When a requestee user, which is requested to perform an operation, is specified, the user ID of the requestee user is stored as a requestee ID. Although specification of the requestee user can be omitted, a password is stored in that case for authentication when a log-in is attempted with a substitution account.

FIG. 6 is a diagram showing an example of the screen that is displayed on the display unit 12 for registering a new substitution account in this embodiment. In the example shown in the drawing, whether to specify the above-described requestee user is set by either checking or not checking a check box 301. If the check box 301 is checked, then the requestee user specifying box 302 can accept input, and if the check box 301 is not checked, then the password specifying box 303 can accept input. However, an embodiment in which no password is input is also feasible.

In addition, the user ID of a requestor user, which has logged in after authentication, is displayed on a requestor user display area 311. The requestor ID is registered as the requestor ID included in the requestor/requestee information shown in FIG. 5.

On the screen shown in FIG. 6, the number of days from the date of input is input into an expiration date input box 321 for specifying an expiration date of the substitution account. Further, the number of logins that can be made using a substitution account is input into a login count input box 322 as another type of information indicating a time of expiration. The login count is reflected in the content of the substitution account database 222. That is, when the number of logins is set, it is possible to manage the login count by decrementing the login count by one each time a login is made with authentication for the substitution account.

Both the number of days and the number of logins can be input. In the case of setting both of them, the substitution account becomes invalid either when the expiration date is reached, or when logins corresponding to the number of logins set have been made. These pieces of information are configured as the expiration information in FIG. 5. The number of days is converted into the expiration date, and stored in the substitution account database 222.

Additionally, the substitution account manager 205 can manage the expiration of each substitution account, and delete any substitution account whose time of expiration has been reached from the substitution account database 222. However, an embodiment in which such a substitution account is rendered invalid (e.g. by setting an invalid flag), without being deleted, is also feasible. It is also possible to set whether to delete a substitution account on a screen as shown in FIG. 6, and to store that setting in the substitution account database 222. In the case of rendering the substitution account invalid, using an invalid flag or the like, without deleting it, an update (e.g. extension of the effective period or re-input of the number of logins) can be performed for the substitution account when the same requestee is requested again to perform an operation. However, in the case of deleting the substitution account, it is necessary to perform a new registration process.

When the check box 331 is checked on the screen shown in FIG. 6, it is possible to limit the functions that can be performed using the substitution account. In this case, it is possible to set functions that can be performed using the substitution account by checking the check box for each function and setting an upper limit of the number of pages that can be processed in a function limit setting area 332. The set values are stored in the substitution account database 222 as the authorization/page count information in FIG. 5.

In the example shown in FIG. 6, the user Mr. "Matsuda" (see the box 311), who has logged in, is not authorized to use a facsimile function (see FIG. 4), and therefore cannot check the check box for specifying the facsimile function. The user Mr. "Matsuda" can check the check boxes for specifying a scan function, a copy function and a print function, but the maximum number of pages that can be set when these boxes are checked is within the maximum number of pages for the account of the logged in user "Matsuda" (see FIG. 4, 2000−26=1974). In the example shown in FIG. 6, since "50" is input as the number of pages that can be processed using the copy function, the maximum number of pages that can be set for the print function, which is in the other check box that has been checked, is 1924. However, an embodiment in which such a limit is not provided is also conceivable.

The function limit setting area 332 shown in FIG. 6 shows the check box for providing a setting "use of interdevice combination function is not permitted", and the interdevice combination function will be described in a later embodiment.

If the check box 341 on the screen shown in FIG. 6 is checked, it is possible to specify one or more operations that are requested to be performed using a substitution account. While it is possible to configure three operations with a requested process detail configuration area 342 shown in FIG. 6, it is possible to configure any given number of operations, and to increase the number of operations that can be specified by scrolling or moving to the next screen, for example. The specified operations are stored in the requested operation management table included in the substitution account database 222.

FIG. 7 is a diagram showing an example of the content of the requested operation management table. In this embodiment, the specified operation is managed by setting an end flag for those of the specified operations that have been performed. End of an operation can be set in response to a notification from the job manager 206. When an operation is performed, the mail transmitting unit 207 sends, to the requestor user, an electronic mail indicating that the specified operation is performed. It should be noted that although not shown in FIG. 7 and FIG. 6, a facsimile destination phone number can be specified in the case of requesting an operation using the facsimile function.

The job manager 206 manages generation of jobs and detects termination of jobs. The job manager 206 can generate a job from the information stored in the requested operation management table, so that printing or facsimile transmission, for example, may be performed. The mail transmitting unit 207 transmits electronic mails notifying completion of the above-described processes, or the registration of a substitution account, for example. The electronic mail address is set by referring to the account database 221.

When a register button 351 is pressed on the screen shown in FIG. 6 after setting the above-described substitution account, the display content controller 201 lets the display unit 12 display a registered content confirmation screen as shown in FIG. 8. Although in this embodiment the substitution account manager 205 automatically provides the substitution account ID, a configuration in which the substitution account ID is specified by the requestor user is also possible.

In the example shown in FIG. 8, no requestee ID is specified, and therefore a mail transmission button 401 cannot be pressed. If the mail transmission button 401 is pressed when a requestee is specified, then the mail transmitting unit 207 sends, to the electronic mail address of the requestee, an electronic mail indicating that a substitution account has been registered. The electronic mail address is set by referring to the account database 221. When the requested operations have been registered, the content of the requested operations can be described in the electronic mail.

If the mail transmission button 401 or a confirmation button 402 is pressed, then the registered content is stored in the substitution account database 222. In the case of correcting the content, it is possible to return to the screen shown in FIG. 6 by pressing a return button 403.

Figure 9:
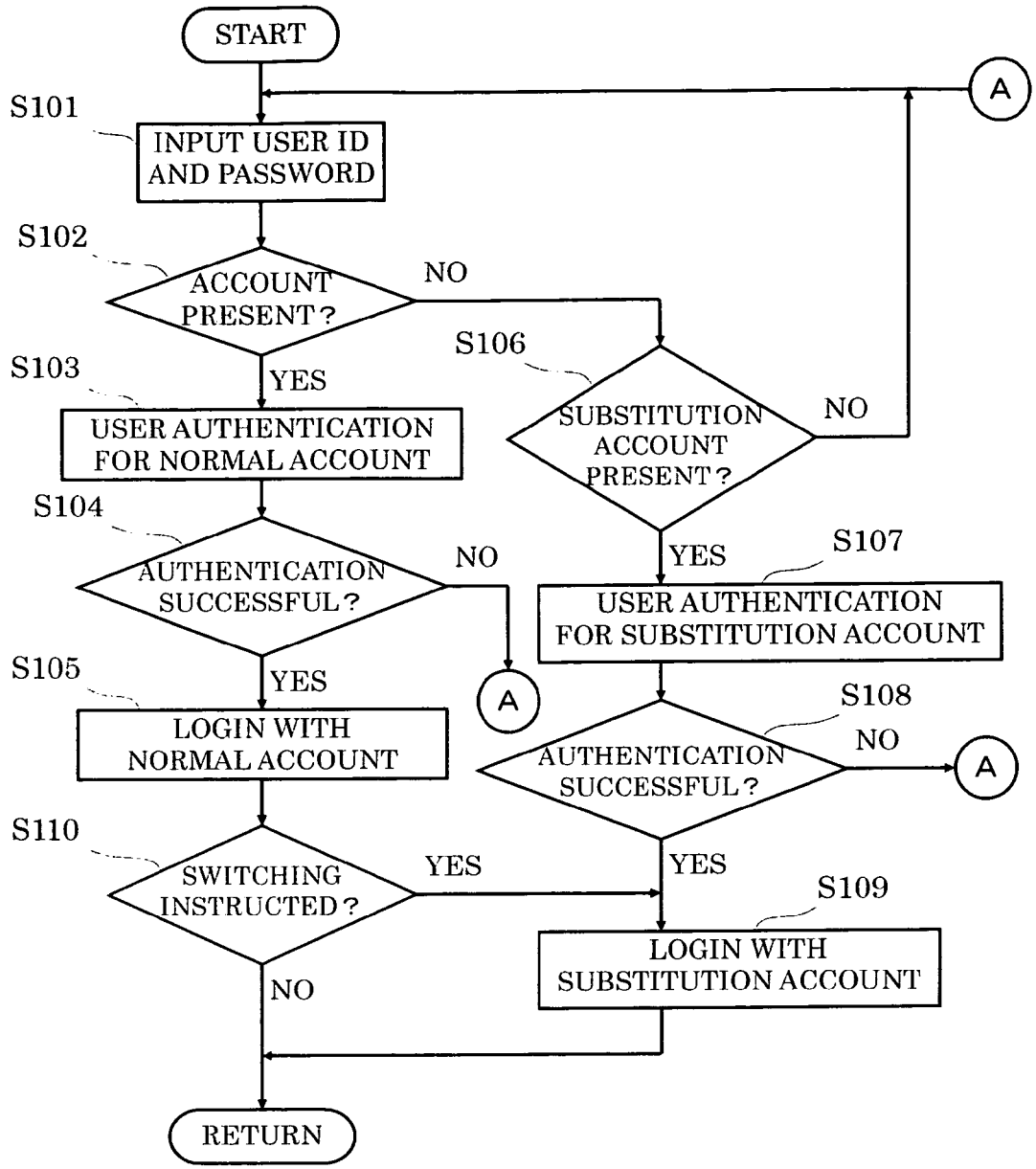
FIG. 9 is a flowchart illustrating an example of a process performed in an MFP 100 when a substitution account has been registered.

In the following, the details of a process performed in the MFP 100 when the substitution accounts are registered are explained with reference to a flowchart. FIG. 9 is a flowchart illustrating an example of the process. When logging in to the MFP 100, a user first inputs the user ID and the password via a user interface such as the operating unit 11 and the display unit 12 (S101). If the input user ID is present in the account database 221 (S102: YES), then the MFP 100 performs user authentication as a normal account (S103).

Figure 10:
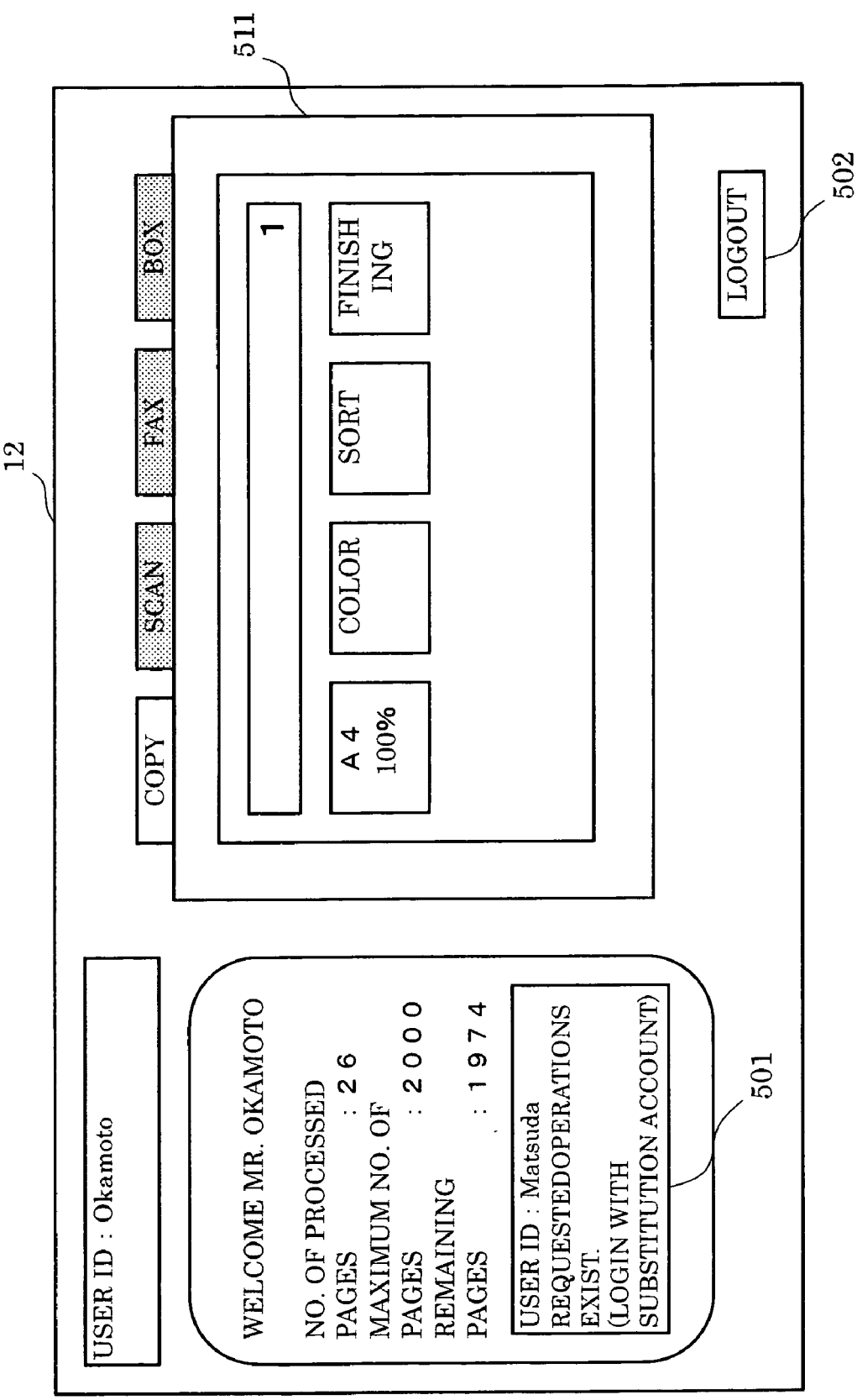
FIG. 10 is a diagram showing an example of the screen displayed on the display unit 12 when a login has been made with a normal account.

Thereafter, if the user ID and the password match those stored in the account database 221, then the authentication is successfully completed (S104: YES), and the user is permitted to log in with the normal account (S105). FIG. 10 is a diagram showing an example of the screen displayed on the display unit 12 when a login has been made with a normal account. In the example shown in the drawing, the maximum number of pages permitted to process stored as the amount information in the account database 221, the number of pages that have been processed, and the number of the remaining pages are displayed.

On the other hand, if the input user ID is not present in the account database 221 (S102: NO), then it is judged whether the input user ID is present in the substitution account database 222 (S106). If the input user ID is not present also in the substitution account database 222, then it can be concluded that there in an error in the input ID, so that the process returns to S101 (S106: NO).

If the input user ID is present in the substitution account database 222 as a substitution account ID (S106: YES), then user authentication is performed as a substitution account (S107). In the user authentication performed here, it is judged whether the password is stored in the substitution account database 222, and whether the input password matches the registered password. In this embodiment, no password is registered for the substitution account when a requestee ID is specified, as shown in FIG. 5. This is because authentication may be performed using the password of the requestee user. If the substitution account ID and the password of a requestee are input when a requestee ID is specified, it is possible to deem the authentication successful, and then to advance the process.

Figure 11:
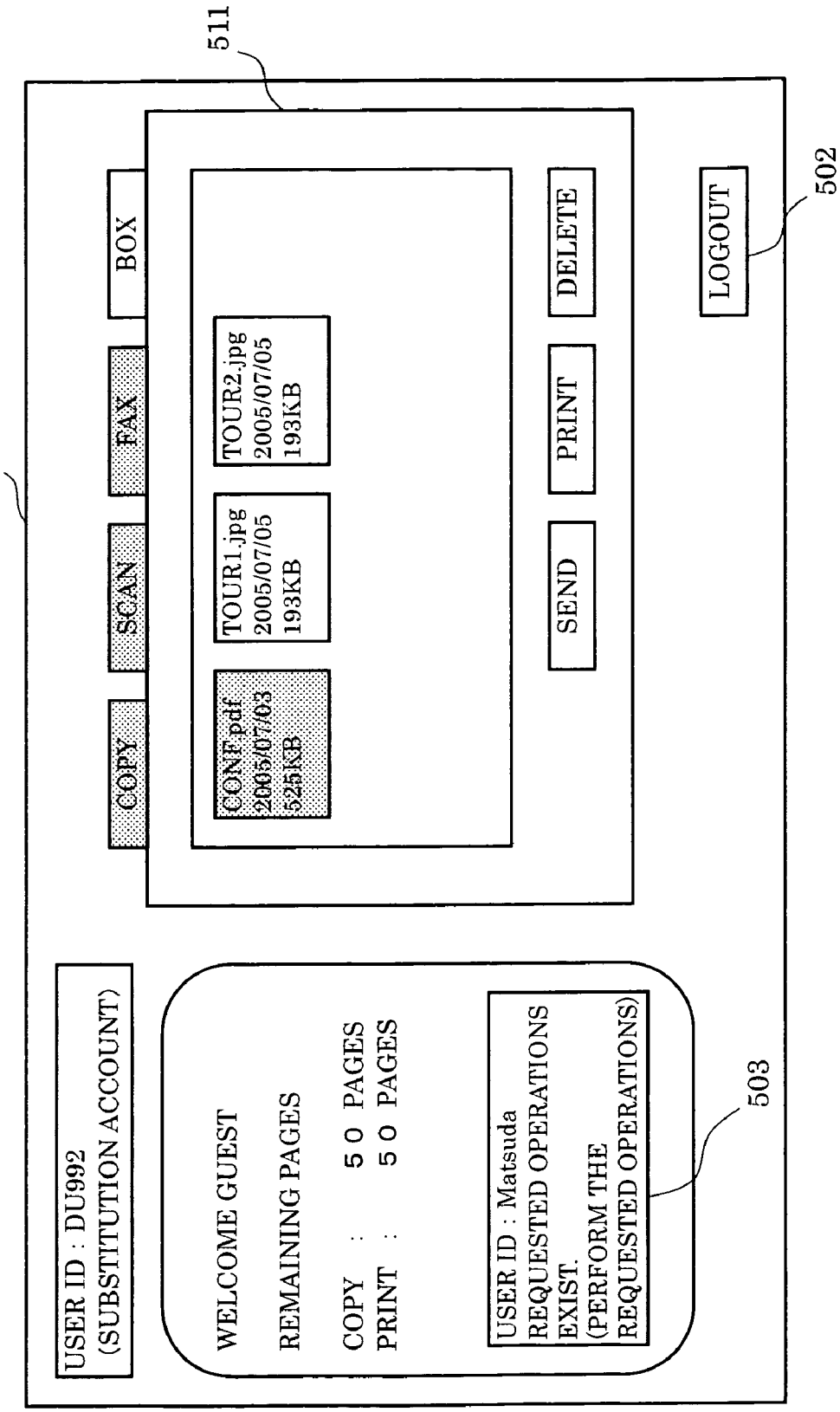
FIG. 11 shows an example of the screen displayed on the display unit 12 when a login has been made with a substitution account.

If the authentication as the substitution account is successfully completed (S108: YES), then the user is permitted to log in with the substitution account (S109). FIG. 11 is a diagram showing an example of the screen displayed on the display unit 12 when a login has been made with a substitution account. Since no requestee is specified in the example shown in the drawing, the message "Welcome Guest" is displayed. When a requestee is specified, the name of that requestee can be displayed. However, it is preferable to display the substitution account ID as the user ID of the logged in user.

As shown in FIG. 10, when a user has logged in with the normal account, and the substitution account specifying that user as the requestee is registered, then a button 501 indicating this is displayed on the display unit 12. The button 501 serves as a switch button to the substitution account, and if the switch button 501 is pressed (S110: YES), then it is possible to switch to a login over the substitution account.

Figure 12:
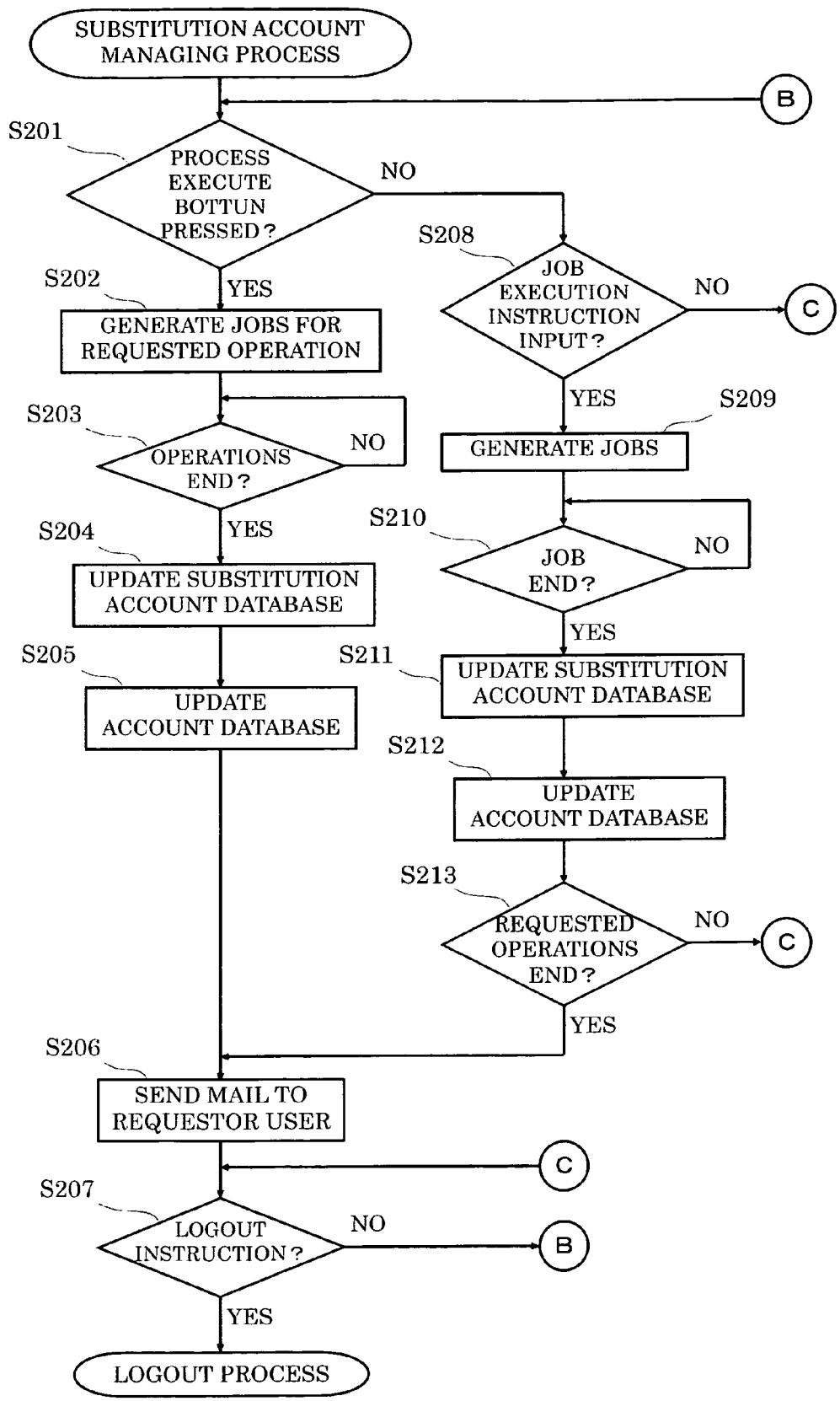
FIG. 12 is a flowchart illustrating an example of the content of a substitution account managing process performed when a login has been made with a substitution account.

For example, as shown in FIG. 11, the substitution account ID is displayed on the screen that is displayed on the display unit 12 after the switching, and moreover, the name of the user, such as "Mr. Okamoto" is displayed in place of "Guest". A button 503 shown in FIG. 11 is a process execute button that is displayed when an operation to be performed is specified by the requestor user for the substitution account, and stored in the table shown in FIG. 7. The process is executed based on the registered operation when the button 503 is pressed. In the following, the content of a substitution account managing process performed when a user has logged in with the substitution account will be described in detail. FIG. 12 is a flowchart illustrating an example of the process. In principle, this process is performed when a screen displaying a substitution account ID is displayed on the display unit 12.

In the substitution account managing process, first, it is judged whether the above-described process execute button 503 is pressed (S201). If the process execute button 503 is pressed (S201: YES), then the job manager 206 automatically generates a job that can be generated, such as printing or facsimile transmission, by referring to the information that has been configured by the requestor user and is stored in the requested operation management table shown in FIG. 7, and executes the job (S202).

In this case, when the generated job for a process comes to an end (S203: YES), the content of the substitution account database 222, specifically, the page count information is updated, and the number of pages that have been processed is subtracted (S204). Next, the content of the account database 221 is also updated (S205). Specifically, the number of pages that have been processed using the substitution account is subtracted from the information of the processed page count that is included in the amount information of the requestor user.

Next, the mail transmitting unit 207 sends, to the requestor user, an electronic mail indicating that the process has been completed (S206). The completed process is described in this electronic mail. The reason is that some jobs, for example, copying cannot be automatically generated even if the process execute button 503 is pressed, and therefore it is preferable to provide a description from which the actually completed process can be determined.

Thereafter, it is judged whether a logout instruction has been given (S207), and if a logout instruction has been given (S207: YES), then a process of logging out is performed. The logout instruction can be given, for example, by pressing a logout button 502 on the screen shown in FIG. 11.

If the process execute button 503 is not pressed (S201: NO), then it is judged whether a job execution instruction has been given (S208). The job execution instruction is performed, for example, via a start button (not shown), which is provided on the operating unit 11 or displayed in the job execution instruction area 511 in FIG. 10 and FIG. 11, and is similar to the job execution instruction given with the normal account, except that the substitution account is used.

If a job execution instruction has been given (S208: YES), then a job is generated and performed (S209). If a job completion is detected by a notification from the job manager 206 (S210: YES), then an update of the content of the substitution account database (S211), and an update of the content of the account database are performed (S212). These are the same as the processes of Steps S204 and S205.

Figure 13:
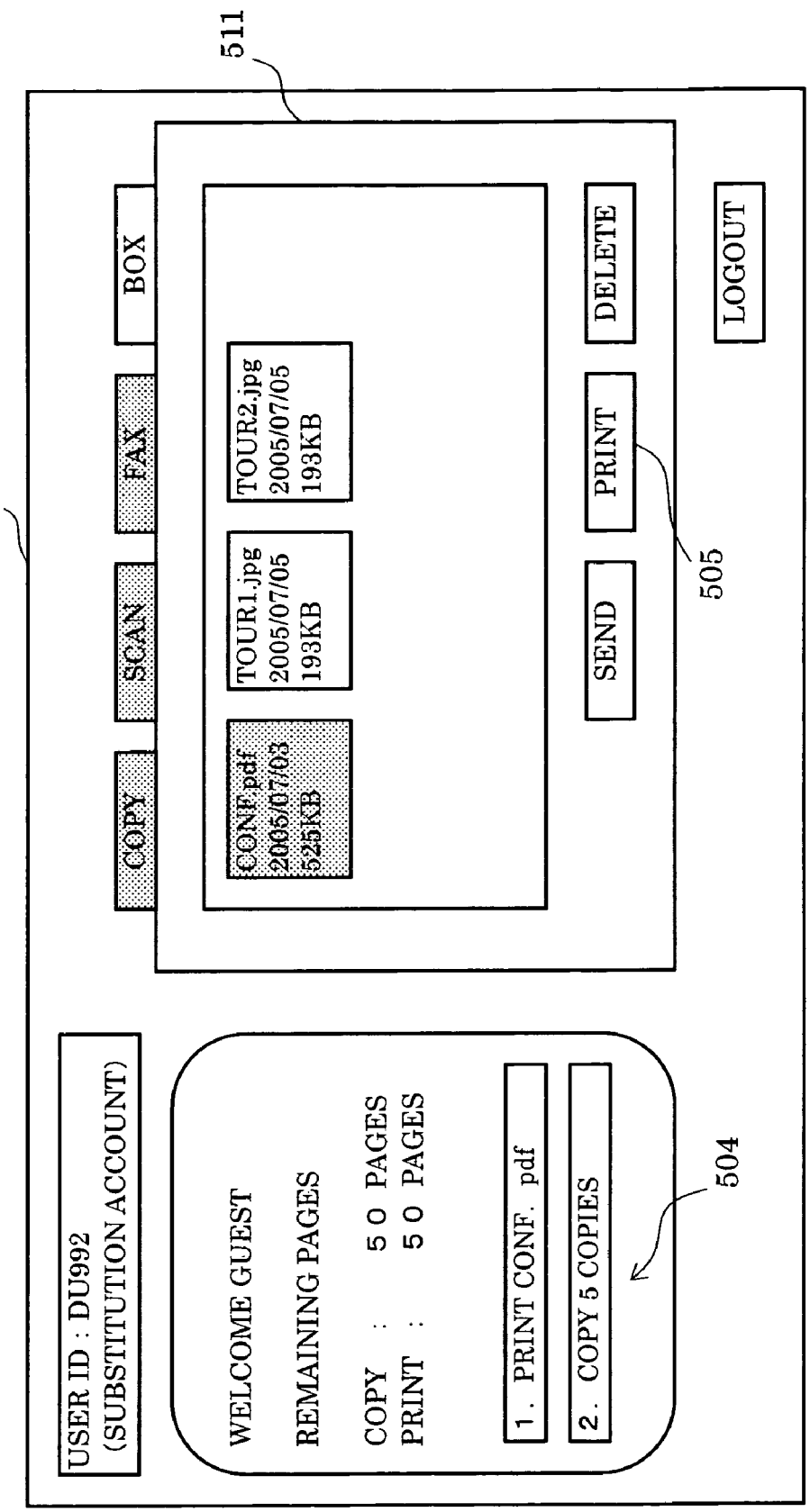
FIG. 13 is a diagram showing an example of the screen displayed on the display unit 12 when a process execute button 503 is not provided, and a requested operation is only displayed on a process display area 504.

Next, it is judged whether the operations that have been specified by the requestor user and are stored in the requested operation management table shown in FIG. 7 have been completed (S213). This judgment is preferable when a job cannot be automatically generated as in the above-described copy function. It is also preferable when the specified operation is only displayed on the process display area 504 without providing the process execute button 503, as shown in FIG. 13. In this case, a user can perform the specified operation with referring to the content of the area 504. When the user manually performs a print operation by pressing the print button 505 while referring to the content of the area 504, the result of the judgment in Step S213 will be YES. This judgment can be realized with a notification from the job manager 206 and the table shown in FIG. 7.

Thereafter, if the requested process has been completed (S213: YES), then the process advances to Step S206, and sends a notification electronic mail to the requester user. If the process stored in the table shown in FIG. 7 has not been completed (S213: NO), then the process advances to Step S207.

As described above, with the image processing apparatus according to this embodiment, a requester user registers a substitution account, and the process performed using the substitution account is managed as a process performed using the account of the requestor user, so that the apparatus can be realized at a lower cost than that using a medium such as IC cards, and can prevent problems, such as misuse.

In the following, the management of the expiration of the substitution account will be described. In this embodiment, it is possible to adopt a configuration in which it is judged whether a substitution account whose time of expiration has been reached remains unused. With this configuration, it is possible to prevent, for example, a situation in which a substitution account becomes invalid before the requestee user performs the requested operation. To perform such a management, for example, it is conceivable to adopt a configuration in which it is judged whether a login has been made using a substitution account, and a flag indicating that a login has been made is set in the substitution account database 222.

Figure 14:
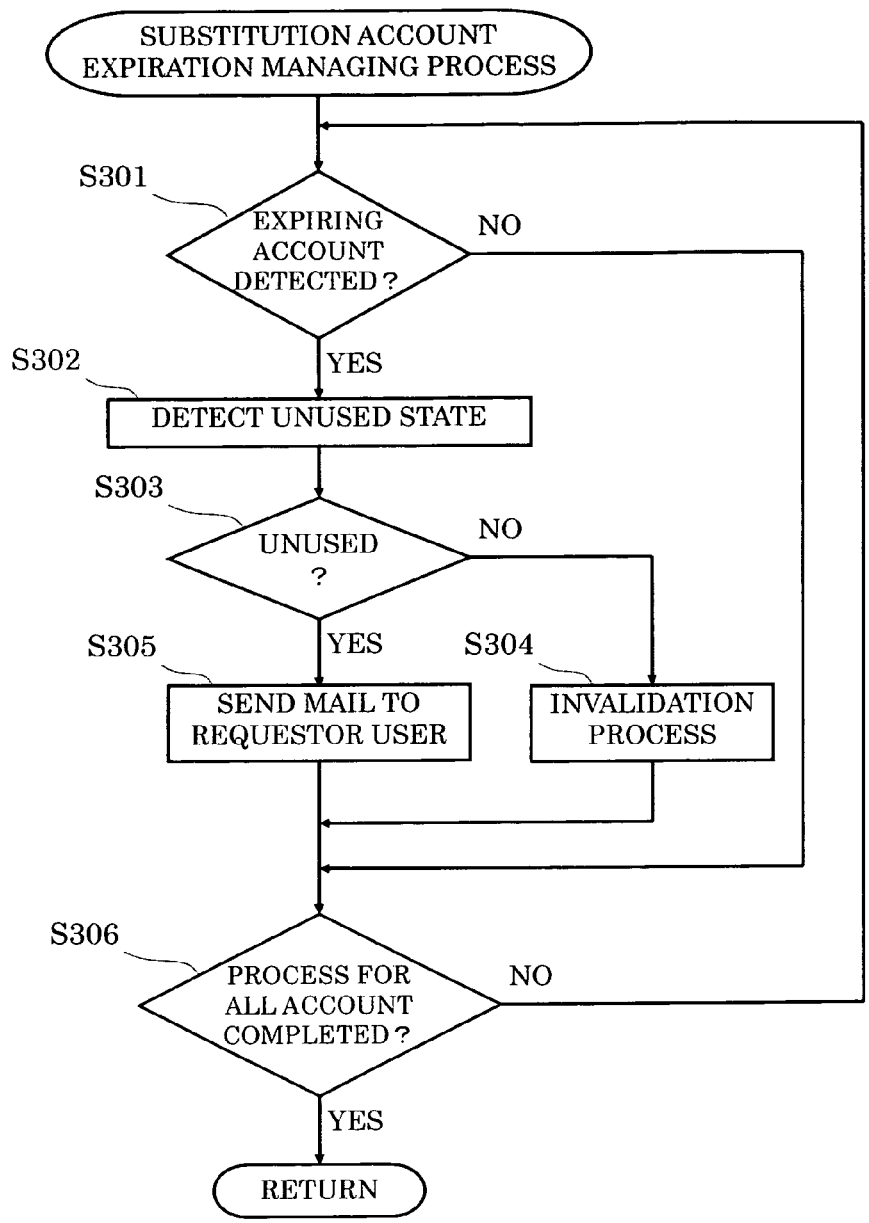
FIG. 14 is a diagram illustrating an example of a process of managing the expiration of a substitution account.

FIG. 14 is a diagram illustrating an example of a process of managing the expiration of substitution accounts. This process can be performed with the substitution account manager 205 periodically referring to the content of the substitution account database 222, for example. First, when a substitution account whose time of expiration has been reached has been detected (S301: YES), it is judged whether that substitution account remains unused (S302).

If it does not remain unused (S303: NO), then a process of invalidating the substitution account is performed (S304). The invalidation process can be performed by deleting the substitution account, or setting an invalid flag, for example. If it remains unused (S303: YES), then an electronic mail indicating this is sent to the requestor user (S305). The requestor user that received this electronic mail indicating that the substitution account remains unused can respond by performing a process such as extension of the effective period, or re-registration of the substitution account. When the process of detecting whether the time of expiration has been reached is completed for all the substitution accounts, (S306: YES), the process of managing the expiration is completed.

Although in the above-described embodiment a case has been described where an instruction to perform a process has been given through operating the operating unit 11, it is also possible to use a substitution account in the case where an instruction to perform a process such as printing can be given from an external apparatus such as a PC connected via a network. In that case, the identifier and the authentication information of the substitution account are input into the external apparatus such as the PC, and the process execution instruction program installed on the PC transmits those identifier and authentication information to the MFP 100. It should be noted that either the password (see FIG. 5) set for the substitution account or the password (see FIG. 4) of the requestee user can be used as the authentication information.

The MFP 100 performs user authentication using the identifier and the authentication information of the substitution account. If the authentication is successfully completed, then the MFP may perform the instructed process, and update the content of the substitution account database 222, as well as the content of the account database 221. This updating process corresponds to the processes of Steps S204 and S205 of the flowchart shown in FIG. 12, and is carried out to reflect the process performed with the substitution account in the account of the requestor user.

Embodiment 2

In the following, a second embodiment of the present invention will be described. In this embodiment, a case will be described where management of processes in the MFP 100, which is an example of the image processing apparatus, is performed with a management apparatus that is connected to the MFP 100.

Figure 15:
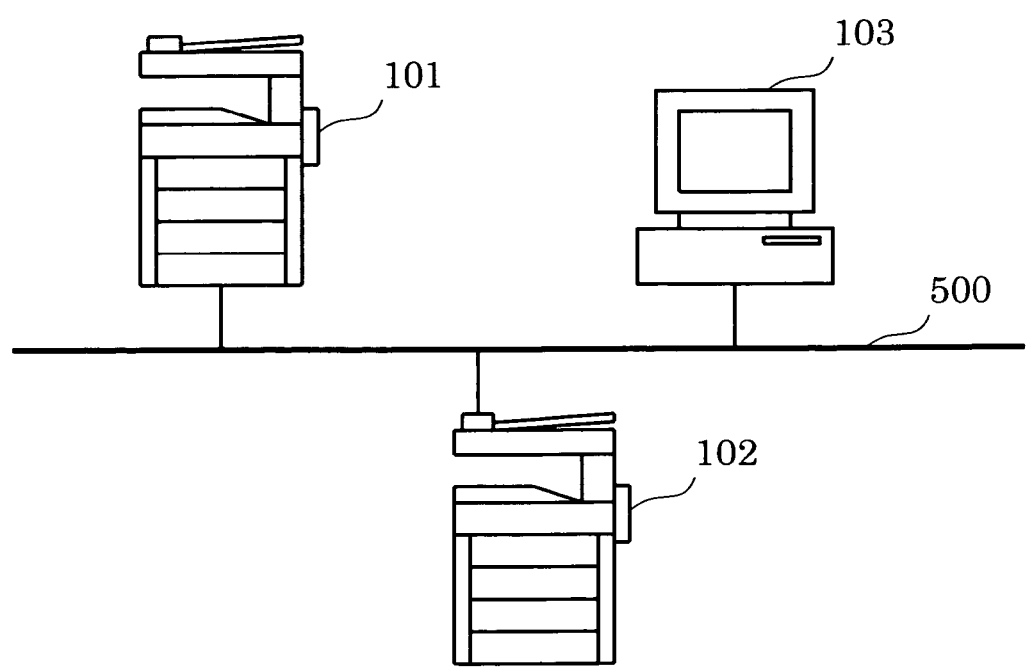
FIG. 15 is a diagram showing an example of the configuration of a management system for an image processing apparatus according to a second embodiment of the present invention.

FIG. 15 is a diagram showing an example of the configuration of a management system for the image processing apparatus according to this embodiment. In the example shown in the drawing, an MFP 102, as well as the MFP 101, which is an example of the image processing apparatus, is connected to a network 500 such as a LAN. Further, a personal computer (PC) 103, which is an example of the management apparatus for the image processing apparatus, is connected to the network 500.

In this embodiment, the MFP 101 is not provided with the function for registering and managing the substitution account. This embodiment is different from the first embodiment in that user authentication is performed with the management apparatus 103 (the technique for providing an external authentication server is known, and may also be applied to the technique described in the first embodiment), and that management of the substitution account is performed with the management apparatus 103.

Figure 16:
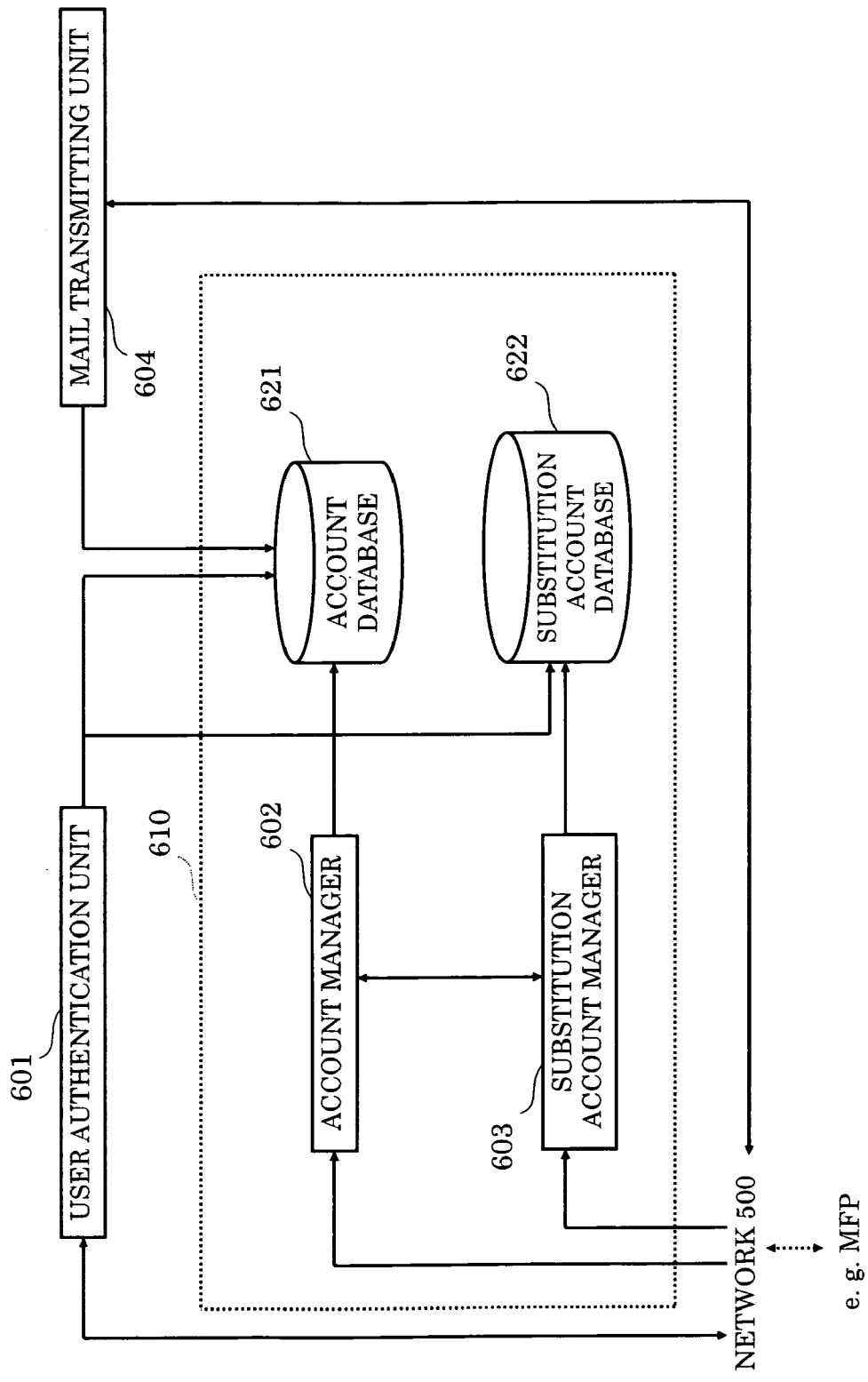
FIG. 16 is a block diagram showing an example of the functional configuration of a management apparatus 103.

FIG. 16 is a block diagram showing an example of the functional configuration of the management apparatus 103 according to this embodiment. The management apparatus 103 includes a user authentication unit 601, an account manager 602, a substitution account manager 603, a mail transmitting unit 604, an account database 621 and a substitution account database 622. The account database 621 and the substitution account database 622 can be provided in the hard disk of the PC 103, for example. These functions can be realized by executing a program installed on the PC 103 coordinating with hardware in the PC 103.

The content of the databases and the process performed at each unit are basically the same as those of the first embodiment, and therefore their detailed description has been omitted here. However, the account manager 602 and the substitution account manager 603 perform, for example, updates of the content of the account database 621 and the substitution account database 622 in accordance with job execution information transmitted from the MFPs via the network 500. When registering a new substitution account, it is possible to display a screen as shown in FIG. 6 on a display unit (not shown) provided to the management apparatus 103, and to register the substitution account using an input device such as a keyboard or a mouse. Additionally, in this embodiment, it is possible to limit available MFPs that can be used with the substitution account.

Furthermore, it is possible to share the same account among a plurality of MFPs for the account or the substitution account that are managed with the management apparatus 103. In that case, the processes performed on each of the MFPs using the same account can be managed together with the management apparatus 103 for each account. That is, there is an advantage that the processes performed in each of the MFP 101 and the MFP 102 using the same substitution account can be managed together with the management apparatus 103.

It is possible, for example, to specify a requested operation, to provide a notification to the requestor user using an electronic mail when the requested operation has been completed, and to provide a notification showing that a substitution account whose time of expiration has been reached remains unused, all in the same manner as in the first embodiment. It should be noted that the function of the management apparatus 103 can be provided in an image processing apparatus such as an MFP.

Embodiment 3

Next, a third embodiment of the present invention will be described. In this embodiment, a case will be described where the above-noted interdevice combination function (see FIG. 6) is used.

Figure 17:
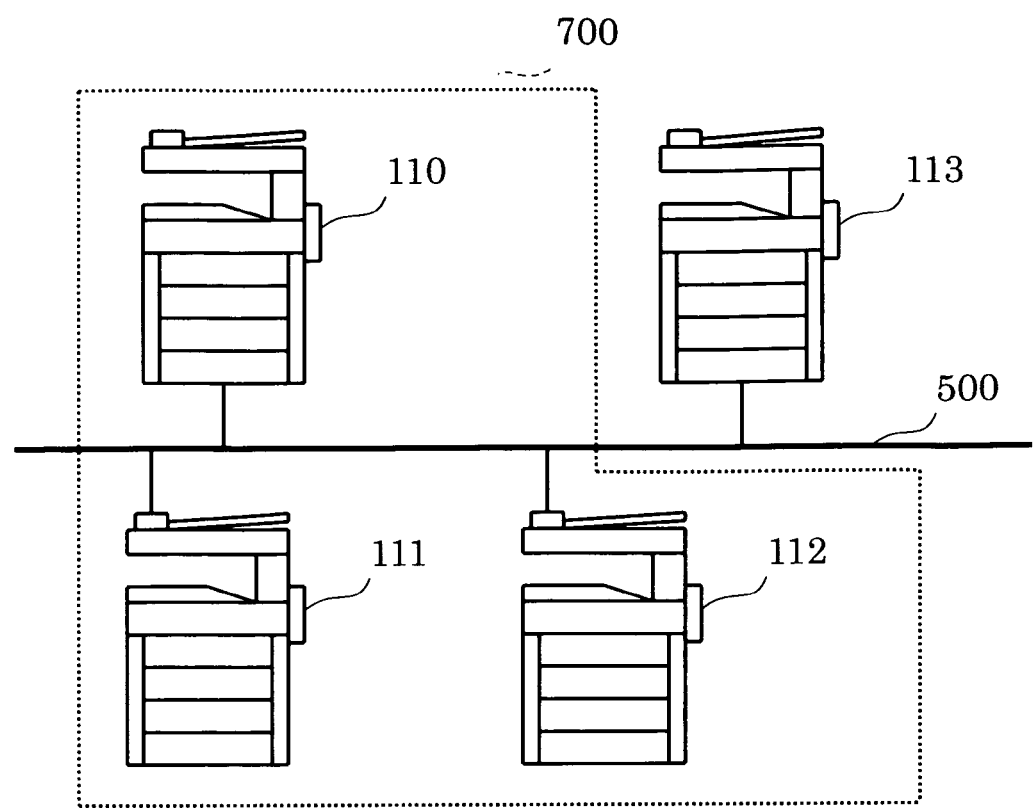
FIG. 17 is a diagram for explaining an interdevice combination function.

FIG. 17 is a diagram for explaining an interdevice combination function according to this embodiment of the present invention. "Interdevice combination function" refers to a function allowing each of the MFPs having the same work group to use the functions and information stored in other MFPs as if using its own functions and information. For preparation of the interdevice combination function when MFPs 110, 111, 112 and 113 are connected to the network 500 (see FIG. 17), a virtual sub network 700 is constructed among a plurality of MFPs 110, 111 and 112 (having the same work group). The virtual sub network 700 is constructed by exchanging predetermined information (including the work group name set in each of the MFPs) among the MFPs connected to the network 500. In each of the MFPs constructing the virtual sub network 700, predetermined information is shared by storing the information in each of the MFPs.

It should be noted that the network 500 may be, for example, a local area network (LAN), and may be connected with or without wires. The network 500 may not necessarily be a LAN, and may be, for example, a wide area network (WAN) such as the Internet, or a network using a public communication line. As noticed above, the MFP 113 is in a different work group from other MFPs, and therefore is not included in the virtual sub network 700 after the virtual sub network 700 is constructed. The virtual sub network 700 is formed by exchanging work group information among image processing apparatuses with broadcast packets, and forming a virtual sub network by the image processing apparatuses in the same work group. It should be noted that any number of image processing apparatuses such as MFPs may constitute the virtual sub network 700.

The MFPs constituting the virtual sub network 700 can share files and the like stored in their hard disks. Since there is the possibility of causing security problems if this function is always made available, whether to permit the use of the interdevice combination function can be set at the time of registering a substitution account in this embodiment (see FIG. 6).

When the use of the interdevice combination function is permitted, a user can perform, for example, a print process of the files stored in other MFPs constituting the virtual sub network 700 when logging in with the substitution account. However, when the use of the interdevice combination function is not permitted, a user cannot use the information stored in other MFPs, and can perform processing by referring to only the data stored in the MFP to which the user has logged in. The setting as to whether to permit the use of the interdevice combination function can be similarly specified when the management of the substitution account is performed at the external management apparatus 103 as in the second embodiment, rather than at the MFP 100.

MODIFIED EXAMPLES

In the foregoing, the embodiments of the present invention have been described, but the present invention is of course not limited to the specific examples illustrated in the above embodiments, and modified examples as shown below can be possible, for example.

(1) The registration of a new substitution account can be performed from outside, such as during a business trip, using a terminal connected via the Internet, a public telephone circuit or a dedicated line, for example. In this case, for example, the MFP is provided with a Web server function, and information, an example of which is shown in FIG. 6, is input via the software, such as a browser, installed on the terminal. By registering the input information in the substitution account database within the MFP, it is possible to let a requestee user perform a process with the MFP on behalf of a requester. Such a registration of the substitution account from the outside can also be performed for the management apparatus 103 of the second embodiment.

(2) Although the detailed description has been omitted in the above-described embodiment, a program for executing, for example, construction of the substitution account database, display of the substitution account registration screen, a process for reflecting, in the existing account database, any process performed with the substitution account, can be incorporated into the existing image processing apparatus by using a version update of its control program.

(3) In the above-described embodiment (FIG. 13), a case was described where the process display area 504 only displays a requested operation, and is not provided with the function of the process execute button. However, it is also possible to provide the function of the process execute button to each of the buttons in FIG. 13. In this case, a job can be generated for each configured operation by pressing the corresponding button, and automatically performed. For example, in the example shown in FIG. 13, a process of making five copies can be performed by placing an original on the document feeder 17, and pressing the button "5 copies".

The above-described image processing apparatus according to the present invention includes: a user identification information acquiring unit that acquires user identification information; a substitution account configuration manager that manages a configuration of a substitution account that is used when a process is performed on behalf of a first user; and an image processing amount managing unit that manages an amount of image processing performed with each account, and manages a process performed with the substitution account as a process performed with the account of the first user.

It is also possible to adopt a configuration in which an authority of the substitution account can be set within the range of authority set for the account of the first user. In this case, it is possible to prevent any function (e.g. when the available functions are restricted) or a processing amount (e.g. the number of pages or sheets) that cannot be performed with the account of the first user, from being performed with the substitution account. However, it is also possible to allow a higher level of authority than that set for the first user to be set for the substitution account. In such a case, any change in the authority set for the account for the first user may be received at a later time, for example.

Additionally, the above-mentioned image processing apparatus may include an authentication unit that obtains, based on the user identification information, an authentication result indicating whether to permit a user corresponding to that user identification information to log in. In this case, authentication information such as a password may be acquired, in addition to the user identification information. While the user authentication may be performed within the image processing apparatus, for example, it is also possible to transmit the user identification information to an external apparatus such as an authentication server, and to acquire an authentication result.

The above-mentioned image processing amount managing unit may include a substitution account manager that manages an amount of image processing performed with each substitution account. However, when a login has been made with the substitution account, it is also possible, for example, to add the number of processed pages directly to the account of the first user, which is a requestor, without managing the number of processed pages for each substitution account.

The above-mentioned image processing amount managing unit may manage the number of pages processed. However, the image processing amount managing unit may manage not only the number of pages or sheets, but also any other given subjects such as the processing time, the operating time of the CPU, the login period and the amount of data processed.

The substitution account configuration manager may manage a type of process that can be performed on behalf of the first user, and/or an upper limit of an image processing amount that can be performed. The above-mentioned type of process may vary depending, for example, on the specification of the image processing apparatus, and examples include scanning, copying, printing and facsimile transmission. It is also possible to provide detailed settings for each type of process. For example, the print process may be limited to black-and-white printing, or single-sided printing. It is also possible to place a restriction on the destination phone numbers for facsimile transmission.

It is preferable that the substitution account configuration manager manages information indicating a condition for an expiration of each substitution account. The above-mentioned information may be information indicating an expiration date of the substitution account. The above-mentioned information may also be information indicating the number of logins permitted with the substitution account. The above-mentioned information may also be an upper limit of a processing amount that can be performed with the substitution account. It is also possible to configure plural types of information, and to invalidate a substitution account if at least one of the conditions is satisfied. In addition, the upper limit of the processing amount may be set separately for each type of process. For example, it is possible to separately set the maximum number of pages for each type of processing, such as printing, copying etc. Please note that it is also possible to set the maximum number of pages for all types of processing in total.

The image processing apparatus may includes: a substitution account setting storing unit that stores information for each substitution account, wherein the information of expired substitution account is deleted from the substitution account setting storing unit. However, it is possible to render the substitution account invalid by setting, for example, an invalid flag, without deleting the substitution account. Invalidating a substitution account without deleting it is convenient in terms of reuse of the substitution account, since it is not necessary to newly register the substitution account at the time of reconfiguration. On the other hand, if a substitution account is deleted, it is necessary to newly register the substitution account when reusing it.

The above-mentioned image processing amount managing unit may include: an unused state determining unit that determines whether the expired substitution account remains unused; and an unused state notifying unit that notifies the first user when the expired substitution account remains unused. With this configuration, it is possible to prevent such a situation in which the substitution account becomes invalid before a user that has been requested to perform an operation on behalf of the first user performs the operation. The unused state notifying unit can provide a notification by sending an electronic mail. However, the method for providing a notification is not limited to this, and it is conceivable to use various methods, including, for example, a messenger application, facsimile transmission, and synthesized voice output by telephone.

The substitution account configuration manager may further manage a second user that uses the substitution account on behalf of the first user. In this case, the substitution account configuration manager may further manage at least one operation that is to be performed by the second user.

It is preferable that the above-mentioned image processing apparatus includes: a display unit; and a display content controller that controls contents that are displayed on the display unit, wherein the display content controller displays the at least one operation on the display unit when the second user has logged in with authentication for the substitution account. For example, in the case of providing, to the second user (requestee user), a notification indicating that a substitution account has been registered by sending an electronic mail, it is possible to instruct the requestee user to perform an operation by describing the requested operation in the electronic mail. However, it will be more convenient for the requestee user actually performing the operation using the image processing apparatus, if the operation is displayed on the display unit of the image processing apparatus.

In the case of not specifying any requestee user, unlike the above-described case, the substitution account configuration manager may further manage at least one operation that is to be performed after logging in with authentication for the substitution account. In this case, the user authentication can be performed using, for example, the identifier provided to the substitution account, and, in some cases, the authentication information, such as a password, provided to the substitution account. Furthermore, it is preferable that the above-mentioned image processing apparatus includes: a display unit; and a display content controller that controls contents that are displayed on the display unit, wherein the display content controller displays the at least one operation on the display unit when a login has made with authentication for the substitution account.

It will be very convenient for the requestee user performing a requested operation, if the image processing apparatus further includes: a process execution instruction input receiving unit that receives an input instructing to execute a process based on one of the at least one operation; and a process execution controller that controls the process to be executed when the process execution instruction input receiving unit receives the input.

It is possible to reliably notify the first user, which is the requestor, of completion of the requested operation, if the image processing apparatus further includes: a process completion notifying unit that notifies the first user when one of the at least one operation is completed. Similarly to the above-described unused state notifying unit, the process completion notifying unit can provide a notification by sending an electronic mail, for example. However, the method for providing a notification is not limited to this, and it is possible to use a method that is different from that used by the unused state notifying unit.

It is preferable that the image processing apparatus further includes: a virtual sub network constructing unit that makes the image processing apparatus exchange a predetermined type of information with another image processing apparatus connected to the image processing apparatus, for allowing data stored in the image processing apparatuses to be shared between the image processing apparatuses, wherein the substitution account configuration manager further manages whether to permit use of data stored in the other image processing apparatus with the substitution account. The reason is as follows. The virtual sub network is constructed, for example, among a plurality of image processing apparatuses in the same work group that are connected to a network, and provides an interdevice combination function that allows the image processing apparatus to access the information in other image processing apparatuses. Accordingly, there is the possibility of causing security problems if use of this function is permitted without any restriction.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An image processing apparatus comprising:
a user identification information acquiring unit that acquires user identification information;
a substitution account configuration manager that manages a configuration of a substitution account that is used when a process is performed on behalf of a first user;
an image processing amount managing unit that manages an amount of image processing performed with each account, and manages a process performed with the substitution account as a process performed with the account of the first user;
a display unit; and
a display content controller that controls contents that are displayed on the display unit,
wherein the substitution account configuration manager further manages a second user that uses the substitution account on behalf of the first user and at least one operation that is to be performed by the second user,
wherein the display content controller displays the at least one operation on the display unit when the second user has logged in with authentication for the substitution account.

2. The image processing apparatus according to claim 1, wherein an authority of the substitution account can be set within the range of authority set for the account of the first user.

3. The image processing apparatus according to claim 1, wherein the image processing apparatus comprises
an authentication unit that obtains, based on the user identification information, an authentication result indicating whether to permit a user corresponding to that user identification information to log in.

4. The image processing apparatus according to claim 1, wherein the image processing amount managing unit comprises
a substitution account manager that manages an amount of image processing performed with each substitution account.

5. The image processing apparatus according to claim 1, wherein the image processing amount managing unit manages the number of pages processed.

6. The image processing apparatus according to claim 1, wherein the substitution account configuration manager manages a type of process that can be performed on behalf of the first user, and/or an upper limit of an image processing amount that can be performed.

7. The image processing apparatus according to claim 1, wherein the substitution account configuration manager manages information indicating a condition for an expiration of each substitution account.

8. The image processing apparatus according to claim 7, wherein the information indicates an expiration date of the substitution account.

9. The image processing apparatus according to claim 7, wherein the information indicates the number of logins permitted with the substitution account.

10. The image processing apparatus according to claim 7, wherein the information is an upper limit of a processing amount that can be performed with the substitution account.

11. The image processing apparatus according to claim 10, wherein the upper limit of the processing amount is set separately for each type of process.

12. The image processing apparatus according to claim 7, comprising
a substitution account setting storing unit that stores information for each substitution account,
wherein the information of expired substitution account is deleted from the substitution account setting storing unit.

13. The image processing apparatus according to claim 7, wherein the image processing amount managing unit comprises:
an unused state determining unit that determines whether the expired substitution account remains unused; and
an unused state notifying unit that notifies the first user when the expired substitution account remains unused.

14. An image processing apparatus comprising:
a user identification information acquiring unit that acquires user identification information;
a substitution account configuration manager that manages a configuration of a substitution account that is used when a process is performed on behalf of a first user;
an image processing amount managing unit that manages an amount of image processing performed with each account, and manages a process performed with the substitution account as a process performed with the account of the first user;
a display unit; and
a display content controller that controls contents that are displayed on the display unit;
wherein the substitution account configuration manager further manages at least one operation that is to be performed after logging in with authentication for the substitution account,
wherein the display content controller displays the at least one operation on the display unit when a login has been made with authentication for the substitution account.

15. The image processing apparatus according to claim 14, further comprising:
a process execution instruction input receiving unit that receives an input instructing to execute a process based on one of the at least one operation; and
a process execution controller that controls the process to be executed when the process execution instruction input receiving unit receives the input.

16. The image processing apparatus according to claim 14, further comprising:
a process completion notifying unit that notifies the first user when one of the at least one operation is completed.

17. An image processing apparatus comprising:
a user identification information acquiring unit that acquires user identification information;
a substitution account configuration manager that manages a configuration of a substitution account that is used when a process is performed on behalf of a first user;
an image processing amount managing unit that manages an amount of image processing performed with each account, and manages a process performed with the substitution account as a process performed with the account of the first user;
a virtual sub network constructing unit that makes the image processing apparatus exchange a predetermined type of information with another image processing apparatus connected to the image processing apparatus, for allowing data stored in the image processing apparatuses to be shared between the image processing apparatuses,
wherein the substitution account configuration manager further manages whether to permit use of data stored in the other image processing apparatus with the substitution account.

18. A management apparatus for an image processing apparatus that receives information transmitted from the image processing apparatus connected to the management apparatus, and manages a process performed in the image processing apparatus, comprising:

a substitution account configuration manager that manages a configuration of a substitution account that is used when a process is performed on behalf of a first user; and an image processing amount managing unit that manages an amount of image processing performed with each account, and manages a process performed with the substitution account as a process performed with the account of the first user, wherein the substitution account configuration manager further manages at least one selected from a type of process that can be performed on behalf of the first user, an upper limit of an image processing amount that can be performed, an available image processing apparatus, information indicating a condition for an expiration of each substitution account, and at least one operation that is to be performed on behalf of the first user.

19. The management apparatus according to claim 18, wherein the image processing amount managing unit comprises a substitution account manager that manages an amount of image processing performed with each substitution account.

20. The management apparatus according to claim 18, wherein the image processing amount managing unit manages the number of pages processed.

21. A method of managing an image processing apparatus, the method comprising:

an account registration step of registering an account of a first user;

a substitution account registration step of registering a substitution account that is used when a process is performed on behalf of the first user; and a substitution account managing step of managing a process performed with the substitution account as a process performed with the account of the first user;

a display content control step of controlling contents that are displayed on a display unit, wherein the substitution account managing step further managing a second user that uses the substitution account on behalf of the first user and at least one operation that is to be performed by the second user, and wherein the display content control step displays the at least one operation on the display unit when the second user has logged in with authentication for the substitution account.

22. A non-transitory computer readable medium storing computer program instructions which when installed on an image processing apparatus that performs an image processing amount managing process of managing an amount of image processing performed with each account, causes the image processing apparatus to perform:

an account registration process of registering an account at a first user;

a substitution account registration process of registering a substitution account that is used when a process is performed on behalf of a first user;

a substitution account managing process of managing a process performed with the substitution account as a process performed with the account of the first user; and a display content control process of controlling contents that are displayed on a display unit, wherein the substitution account managing process further manages a second user that uses the substitution account on behalf of the first user and at least one operation that is to be performed by the second user, and wherein the display content control process displays the at least one operation on the display unit when the second user has logged in with authentication for the substitution account.

23. A method of managing a management apparatus for an image processing apparatus that receives information transmitted from the image processing apparatus connected to the management apparatus, and manages a process performed in the image processing apparatus, the method comprising:

a substitution account configuration step of managing a configuration of a substitution account that is used when a process is performed on behalf of a first user; and an image processing amount managing step of managing an amount of image processing performed with each account, and managing a process performed with the substitution account as a process performed with the account of the first user, wherein the substitution account configuration step further managing at least one selected from a type of process that can be performed on behalf of the first user, an upper limit of an image processing amount that can be performed, an available image processing apparatus, information indicating a condition for an expiration of each substitution account, and at least one operation that is to be performed on behalf of the first user.

24. A non-transitory computer readable medium storing computer program instructions which when installed on a management apparatus for an image processing apparatus that receives information transmitted from the image processing apparatus connected to the management apparatus, causes the management apparatus to perform:

a substitution account configuration step of managing a configuration of a substitution account that is used when a process is performed on behalf of a first user; and an image processing amount managing step of managing an amount of image processing performed with each account, and managing a process performed with the substitution account as a process performed with the account of the first user, wherein the substitution account configuration step further managing at least one selected from a type of process that can be performed on behalf of the first user, an upper limit of an image processing amount that can be performed, an available image processing apparatus, information indicating a condition for an expiration of each substitution account, and at least one operation that is to be performed on behalf of the first user.

* * * * *